United States Patent [19]

Marsh

[11] Patent Number: 5,302,889
[45] Date of Patent: Apr. 12, 1994

[54] VOLTAGE REGULATOR

[75] Inventor: Brian J. Marsh, Freeport, Ill.

[73] Assignee: Honeywell Inc., Minneapolis, Minn.

[21] Appl. No.: 901,641

[22] Filed: Jun. 19, 1992

[51] Int. Cl.$^5$ ............................................. G05F 1/56
[52] U.S. Cl. .................................. 323/284; 323/285; 363/74; 363/97
[58] Field of Search ............... 323/284, 282, 285, 247, 323/265, 275; 363/74, 97; G08F 1/56

[56] References Cited

U.S. PATENT DOCUMENTS

| | | | |
|---|---|---|---|
| 3,764,880 | 10/1973 | Rose | 363/74 |
| 4,142,219 | 2/1979 | Kuwabara et al. | 361/18 |
| 4,146,832 | 3/1979 | McConnell | 323/17 |
| 4,205,327 | 5/1980 | Dahlke | 340/870.37 |
| 4,219,803 | 8/1980 | Kuwabara et al. | 340/595 |
| 4,250,490 | 2/1981 | Dahlke | 340/208 |
| 4,271,448 | 6/1981 | Pond | 361/93 |
| 4,329,730 | 5/1982 | Ryczek et al. | 361/100 |
| 5,019,952 | 5/1991 | Smolenski et al. | 303/17 |
| 5,081,411 | 1/1992 | Walker | 323/285 |
| 5,180,964 | 1/1993 | Ewing | 323/222 |

Primary Examiner—Steven L. Stephan
Assistant Examiner—Adolf Berhane
Attorney, Agent, or Firm—William D. Lanyi

[57] ABSTRACT

A voltage regulator circuit is provided for a sensor that is connected in a two-wire scheme to a circuit comprising a power supply and a load. The circuit regulates the current flowing through the load when the sensor output is inactive and provides power to the sensor during periods of time when the input power of the regulator circuit is insufficient to do so. A current monitor and a voltage monitor are provided which utilize common circuit elements to control the current flowing through the circuit. The operational characteristics of a MOSFET device are used advantageously to control the magnitude of current flowing through the sensor and regulate the current as a function of both the magnitude of current and the magnitude of a voltage potential across a bulk capacitor.

19 Claims, 5 Drawing Sheets

Fig.5

VOLTAGE REGULATOR

BACKGROUND OF THE INVENTION

1. Field of the Invention

The present invention relates generally to a voltage regulator for a sensor and, more particularly, to a regulator circuit that is connectable in series between an AC power source and a load and provides a means for monitoring both the current and voltage of the circuit in association with a means for controlling the current in response to both the current and voltage monitoring means.

2. Description of the Prior Art

It is well known to those skilled in the art that a voltage regulator circuit can be provided for connection in an electrical circuit in series with an AC power supply and a load. For example, voltage regulators of this type are used to provide DC power for a sensor such as a photoelectric sensor or a proximity detector. When the sensor is not in a condition under which the load is intended to receive power from the power supply, the regulator circuit passes only a minimal current through the load sufficient to power the sensor. When the sensor, on the other hand, senses a status under which the load is to be provided with electrical power from the power supply, the voltage regulator circuit connects the load to the power supply.

U.S. Pat. No. 4,219,803, which issued to Kuwabara et al on Aug. 26, 1980, describes a two-wire fire sensing and receiving system. The system has a plurality of fire sensors connected in parallel in which the difference in current level between a feeding electric circuit of a relatively small level for controlling the system and a sensing current of a relatively high level for causing the switching element of an alarm device to be conductive is maintained to distinguish the current levels by restraining the current which tends to increase at the beginning of capacitor charging and at intermittent charging periods within the level of the feeding electric current without being affected by the fluxuation in power supply voltage.

U.S. Pat. No. 4,205,327, which issued to Dahlke on May 27, 1980, discloses a two-wire current transmitter. The transmitter is intended to control the total current in the two-wires in accordance with a value of a parameter to be sensed. The transmitter provides for substantial linearization of the electrical characteristic representative of the value of the parameter to be sensed by adjusting the current from an adjustable current control to substantially compensate for the nonlinear relationship of the parameter to be sensed versus the electrical output of the sensor of the parameter. The circuit also provides for substantial compensation for sensor lead wire effects.

U.S. Pat. No. 4,142,219, which issued to Kuwabara et al on Feb. 27, 1979, discloses a two-wire system that includes a signal receiving section and a detection section with a protected relay. The system includes a power source, a signal receiving section and a sensing device in series which supplies electric power to and receives sensing signals from signaling devices in the system. A capacitor is connected to each sensing device for preventing a voltage drop upon initiation of its sensing action. A buffer circuit is further coupled with the receiving section for protecting against false operation by an initial current which increases upon switching the power source, thus insuring that the system becomes stable.

U.S. Pat. No. 4,250,490, which issued to Dahlke on Feb. 10, 1981, describes a two-wire transmitter for converting a varying signal from a remote sensor to a DC current signal. The transmitter provides a signal representative of a parameter measured by a variable reactance sensor which may be located in a hostile environment. The sensor may also be remote from the signal conditioning and transmitter electronics. Transmission circuitry from the electronics includes a separate transformer winding energized by a pair of twisted cables to reduce the capacitive, inductive and resistive effects of long wires. The transformer circuitry provides power to the sensor which provides the signal conditioning and transmitter electronics a signal representing the parameter measured. The system permits the modification of the total current through the two wires used to carry power to the signal conditioning and transmitter electronics so that the total current is representative of the measured parameter.

U.S. Pat. No. 4,271,448, which issued to Pond on Jun. 2, 1981, discloses an electronic protection circuit for solid state switches energizing AC loads. The two-terminal circuit of the fold-back type is inserted in electrical series relationship with an AC load and an associated load energizing, solid state, semiconductor switch. Under normal operating conditions, the transistor circuit presents a very low impedance to permit load energization when the solid state switch is conducting and hence has a very low impedance. Upon sensing an overcurrent condition, caused for example by a short circuit across the load, the transistor circuit rapidly switches to and locks into a high impedance circuit protection state to limit current through the series associated solid state switch. A charged capacitor holds the transistor circuit into its high impedance state subsequent to clearing of the short circuit fault until reset by interrupting the application of power to it. The disclosed protection scheme finds particularly advantageous use in the short circuit protection of an AC line operated proximity switch.

U.S. Pat. No. 4,329,730, which issued to Ryczek et al on May 11, 1982, discloses a DC switch circuit applicable for a switch which receives an input from a sensor head such as a proximity sensor, limit switch or other type of condition responsive sensor. In its most complex form, the circuit includes a power supply/regulator, an output load current source, an output load current sink, input logic to receive the signal from the sensing head, a selector to determine whether the source and sink will be normally opened or normally closed, and a device for checking the outputs for faults and indicating the presence of such.

As the technology relating to sensors advances, the demand for significantly reduced size and cost of the sensors also increases. As the size of sensors decreases, the size of the voltage regulator circuit used in association with the sensing circuitry must also decrease. It would therefore be beneficial if a voltage regulator circuit for a sensing device can minimize the number of high power components and utilize individual components for more than one purpose within the circuit. The reduction of high power components in the voltage regulator circuit permits the regulator to be enclosed within a housing of reduced size and, in addition, reduces the overall cost of the circuit.

SUMMARY OF THE INVENTION

The present invention provides a voltage regulator that comprises first and second circuit points that are connectable to a source of rectified AC power. In one exemplary application of a preferred embodiment of the present invention, the first and second circuit points are connected across a rectifier bridge which comprises four diodes. The input of the bridge is connected to a source of AC power. When applied in this manner, the first and second circuit points receive a rectified AC current. A preferred embodiment of the present invention also comprises third and fourth circuit points that are connectable to a device which requires DC power. In a typical application of the present application, the device requiring DC power is a sensor, such as a photoelectric sensor or a proximity detector. The circuit of the present invention therefore receives power in the form of a rectified AC signal and provides power to the sensor in the form of a DC voltage regulated to a predetermined magnitude.

A means for storing power is connected between the third and fourth circuit points of the present invention. In a preferred embodiment, the power storing means comprises a capacitor. The capacitor is connected between the third and fourth circuit points of the present invention. In addition, a means for monitoring current flow between the first and second circuit points is provided. In a preferred embodiment of the present invention, the current monitoring means comprises a transistor, connected between the first and third circuit points, which is responsive to a current flowing between the first and second circuit points. A preferred embodiment of the present invention also comprises a means for monitoring the voltage potential between the third and fourth circuit points. In a preferred embodiment of the present invention, the voltage monitoring means comprises a Zener diode connected to the power storing means.

The present invention comprises a means for controlling the current flow between the first and second circuit points which is responsive to the current monitoring means and the voltage monitoring means. In other words, the current flowing through the circuit can be controlled in response to a voltage exceeding a predetermined magnitude or a current exceeding a predetermined magnitude. A preferred embodiment of the present invention also comprises a means for selectively connecting and disconnecting the first and second circuit points in shorted electrical communication with each other. In a preferred embodiment of the present invention, this connecting and disconnecting means comprises a silicon controlled rectifier connected across the first and second circuit points. A means is provided for causing the connecting and disconnecting means to connect the first and second circuit points in shorted electrical communication with each other in response to a preselected signal from the sensing device connected to the third and fourth circuit points. In addition, when the preselected signal is received from the sensing device, a means is provided for rapidly providing current to the power storing means described above. In addition, when the preselected signal is received from the device, the present invention provides a means for disabling the current monitor.

BRIEF DESCRIPTION OF THE DRAWINGS

The present invention will be more fully understood from a reading of the Description of the Preferred Embodiment conjunction with the drawing, in which.

DESCRIPTION OF THE PREFERRED EMBODIMENT

Throughout the Description of the Preferred Embodiment, like components will be identified with like reference numerals.

Figure 1:
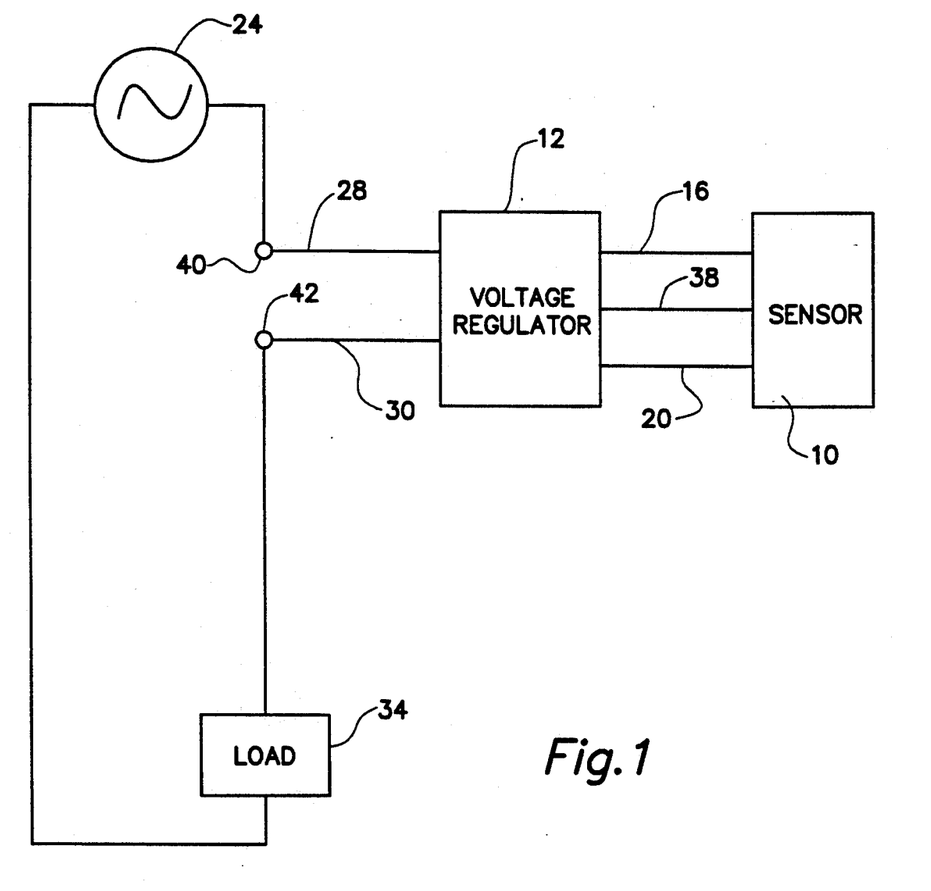
FIG. 1 shows an exemplary circuit with which the present invention can be used.

Many applications exist where a sensor is disposed at a location for sensing a preselected condition. In response to the sensing of the preselected condition, a predetermined action is initiated. For example, a sensor may comprise a photoelectric device positioned to sense the presence of an object in a predetermined location. In response to the sensing of the object, the action to be initiated can be the energization of a motor. An example of this type of arrangement is shown in the illustration of FIG. 1. A sensor 10, such as a photoelectric sensor or a proximity detector, is connected to a voltage regulator circuit ;2 which provides power to the sensor 10 through lines 16 and 20. The voltage regulator 12 is provided with power from a power supply 24. As can be seen in FIG. 1, the regulator 12 is connected, by lines 28 and 30, in series with the power supply 24 and a load 34. In a typical application of a sensor 10, the load 34 can be a motor, a solenoid, an annunciator device or any other load that is intended to respond to a signal from the sensor 10. The load 34 is intended to receive operative power from the power supply 24 only when a predetermined condition exists with regard to the sensor 10. In other words, if the load 34 is a motor, the motor is only intended to be energized if a particular condition exists with respect to the sensor 10.

With continued reference to FIG. 1, it should be realized that the sensor 10 requires power on lines 16 and 20 even when no operative power is to be received by the load 34. The power received by the sensor 10 must be minimized so as to avoid energizing the load 34 prior to the existence of the predetermined condition with regard to the sensor.

When the sensor 10 reacts to a stimulus, such as the presence of an object in a preselected zone, the sensor provides a signal on line 38 to the voltage regulator 12 which, in turn, connects lines 28 and 30 in short circuit relation with each other to provide a direct connection between the power supply 24 and the load 34. Many different types of devices which accomplish the function illustrated in FIG. 1 and described above are known to those skilled in the art. However, the known voltage regulators require the use of many high power components and therefore require relatively large and expensive circuits to accomplish the functions described above. The present invention reduces the size and cost of the voltage regulator circuit by utilizing certain components for dual purposes and arranging the voltage regulator circuit in such a way that fewer high power components are required.

In the embodiment of the present invention shown in FIG. 2, which will be described below, the components in the circuit have the values or are of the type indicated in Table I shown below.

TABLE I

| Reference | Type or value |
| --- | --- |
| Q1 | BSP135 (Siemens) |
| Q2 | BCW32 (Motorola) |
| Q3 | MMBT5087 (Motorola) |
| Q4 | MMBT5087 (Motorola) |
| R1 | 330 Ω |
| R2 | 100 KΩ |
| R3 | 10 KΩ |
| R4 | 10 KΩ |
| R5 | 330 Ω |
| R6 | 10 KΩ |
| C1 | 6.8 microfarad |
| CR2 | MMBD914 (Motorola) |
| VR1 | 12 V |
| VR2 | 12 V |
| VR3 | 3.9 V |
| SCR1 | 2N6240 (Motorola) |

Figure 2:
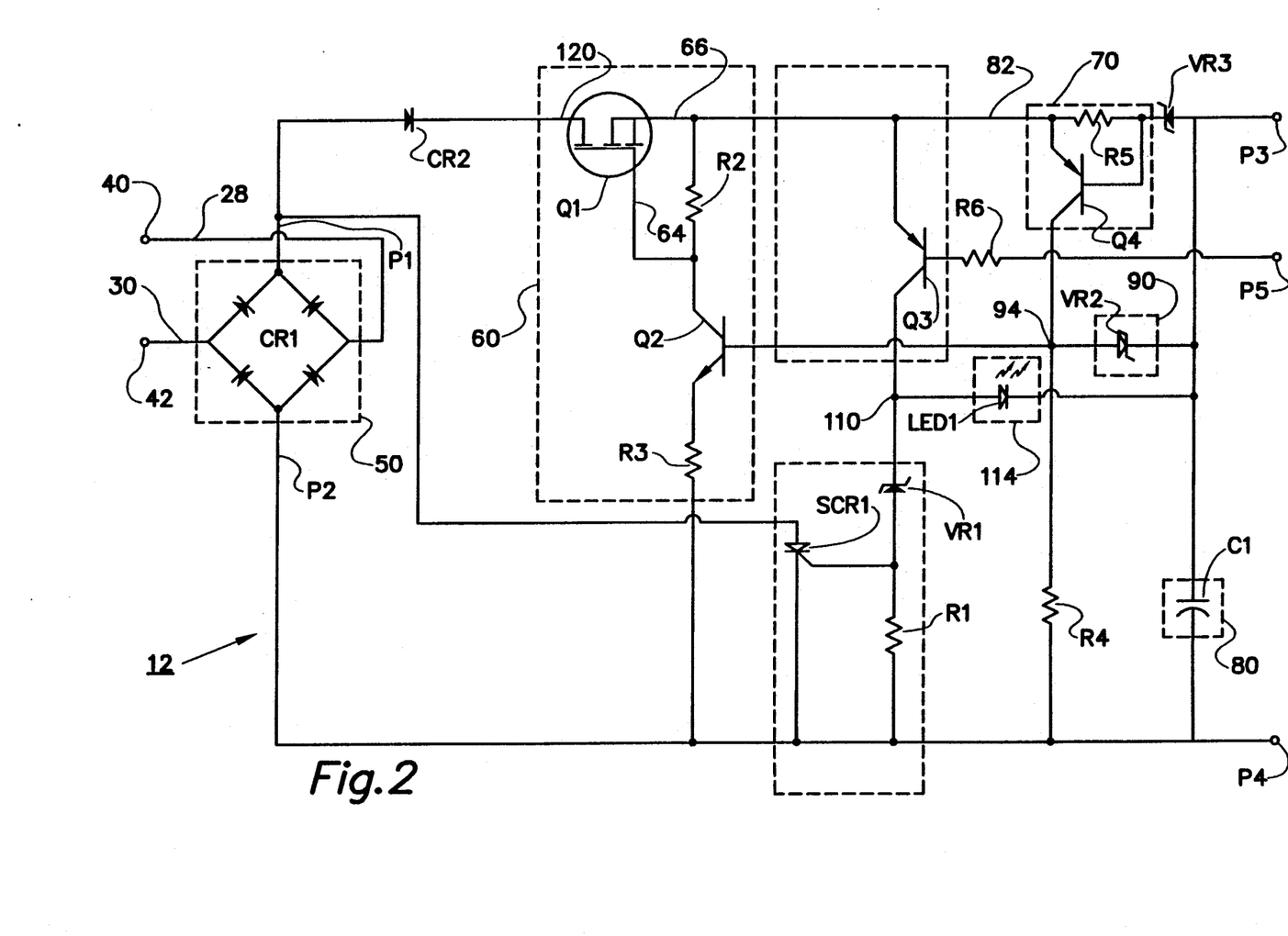
FIG. 2 shows a preferred embodiment of the circuit of the present invention.

In FIG. 2, the circuit identified by reference numeral 12 in FIG. 1 is shown in schematic representation. First and second circuit points, P1 and P2, are provided which are connectable to a rectifying means 50. The rectifying means is connectable to an AC power supply between points 40 and 42. The four diodes arranged in a bridge association CR1 rectify the AC power and provide the rectified waveform at points P1 and P2.

A means for controlling the electric current between the first circuit point P1 and a third circuit point P3 is identified by reference numeral 60 in FIG. 2. The controlling means 60 comprises a MOSFET Q1 that is connected with its source and drain in series between circuit points P1 and P3. In a preferred embodiment of the present invention, the MOSFET Q1 is an n-channel depletion mode MOSFET. The characterization of this type of device is that it will conduct a predetermined current between its source and drain until the voltage potential between its gate and its source achieves a predetermined negative voltage magnitude. In other words, MOSFET Q1 will conduct a current until the voltage at its gate 64 is a predetermined magnitude less than the voltage at its source 66. The current flow through MOSFET Q1 can be reduced by passing a current through resistor R2 to create a voltage differential between its source 66 and gate 64. This is accomplished by the NPN transistor Q2 and resistor R3 which are also included in the current controller 60. When the base of transistor Q2 is energized, the current flowing through resistors R2 and R3 will provide a sufficient voltage across resistor R2 to reduce or halt the current flowing through MOSFET Q1.

With continued reference to FIG. 2, the present invention provides a current monitor 70 which comprises a PNP transistor Q4 and a resistor R5. When a current flows between circuit point P1 and circuit point P3, the voltage drop across resistor R5 activates transistor Q4 which, in turn, provides a base current for transistor Q2. As described above, when a base current is provided to energize transistor Q2, current flows through resistors R2 and R3 to provide the necessary drop between the gate and source of MOSFET Q1. In other words, when the current flowing through resistor R5 is sufficient to energize transistor Q4, it causes MOSFET Q1 to decrease the current flow. This results in an equilibrium current flowing through MOSFET Q1 which has a magnitude determined by the components of the current monitor 70.

A means is provided for storing power in the circuit shown in FIG. 2. In a preferred embodiment, this power storing means 80 comprises a capacitor C1 connected between the third P3 and fourth P4 circuit points. When the voltage on line 82 exceeds the value of Zener diode VR3, current will flow through the Zener diode VR3 to circuit point P3 and to the capacitor C1. The current flowing to circuit point P3 provides power for operation of a sensing device connected across circuit points P3 and P4 such as a photoelectric device or a proximity detector. A means is provided for monitoring the voltage across the capacitor C1. In FIG. 2, this voltage monitoring means 90 comprises a Zener diode VR2 which is connected to the capacitor C1. When the voltage at the capacitor C1 achieves a predetermined magnitude in response to the current flowing through line 82, the Zener diode 82 breaks over and permits a current to flow to the base of transistor Q2. In a manner similar to that described in conjunction with the current monitor 70, the voltage monitor 90 can affect the MOSFET Q1 to reduce the current flowing through line 82.

Both the current monitor 70 and the voltage monitor 90 are connected to a circuit point 94 which, in turn, is connected to the base of transistor Q2. Therefore, the voltage and current monitors can each cause MOSFET Q1 to reduce the current flowing through line 82 in response to a current or voltage, respectively, that exceeds a predetermined limit. The above description with regard to the current monitor 70, the voltage monitor 90 and the current controller 60 relates to the operation of the circuit when circuit point P5 is not connected to ground. This circuit point provides a means for the sensing device which is connected to circuit points P3 and P4 to signal a condition to the voltage regulator circuit which requires a load to be connected in series with a power supply. As described above, that condition can be an object located within a predetermined zone proximate a proximity sensor or any other condition intended to be sensed by the device connected between the third and fourth circuit points, P3 and P4.

When the device that is connected to the third and fourth circuit points senses a predefined condition, it connects the fifth circuit point P5 to ground. This causes PNP transistor Q3 to conduct a current between line 82 and circuit point 110. When current flows through transistor Q3, it immediately flows through a means for rapidly charging capacitor C1. That rapid charging means 114 comprises a light emitting diode LED1 in a preferred embodiment of the present invention. As can be seen, a direct connection is made between line 82 and capacitor C1, through transistor Q3 and light emitting diode LED1, when circuit point P5 is connected to ground to activate transistor Q3. This connection rapidly charges capacitor C1 when a sensed condition exists with regard to the sensor connected to circuit points P3 and P4. When the voltage across capacitor C1 exceeds the break over voltage of Zener diode VR1, a current passes through this Zener diode and activates the silicon controlled rectifier SCR1.

When activated, the silicon controlled rectifier directly connects circuit points P1 and P2 together in a short circuit electrical connection association. This provides power to the load shown in FIG. 1 by directly connected circuit points 40 and 42 together.

Since the power available at circuit points P1 and P3 is a rectified AC waveform, the voltage at the drain 120 of MOSFET Q1 repeatedly achieves a zero voltage potential. When this occurs, its ability to conduct a current therethrough is removed and the availability of a current flowing through line 82 is also reduced to zero. During this period of time, capacitor C1 provides power to the third circuit point P3 and the device connected to the third and fourth circuit points by depleting its charge when no current is flowing through line 82. Eventually, the rectified AC waveform provided between circuit points P1 and P2 again achieves a sufficient magnitude to cause a current to flow through MOSFET Q1. When this current begins to flow and the voltage at circuit point P1 exceeds the break over value of Zener diode VR3, the capacitor C1 again begins to charge and the cycle is repeated.

The operation of the circuit in FIG. 2 will be described below in conjunction with the time based waveforms FIGS. 3, 4 and 5 to describe its operation in greater detail. The operation of the circuit in FIG. 2 will be described under both the condition when the fifth circuit point P5 is not connected to ground and under the condition when circuit point P5 is connected to ground by a device connected across the third and fourth circuit points, P3 and P4, to represent the condition that a status monitored by the sensor has been achieved.

In order to describe the operation of the circuit in FIG. 2, reference will be made to the time-based waveforms of FIG. 3. The top waveform 130 of FIG. 3 shows the output voltage of rectifier CR1 across circuit points P1 and P2. The waveform 130 represents the rectified form of the input AC voltage provided across circuit points 40 and 42. Immediately below the top illustration in FIG. 3, the two waveforms identified by bracket A represent the voltage across the capacitor C1 and the voltage $V_g$ at the gate 64 when circuit point P5 is not connected to ground. The bottom two waveforms in FIG. 3, which are identified by bracket B, represent the voltage across capacitor C1 and the source voltage $V_g$ of MOSFET Q1 when circuit point P5 is connected to ground. In other words, bracket A shows the time-based changes in the two identified voltages when the sensor connected across the output of the circuit in FIG. 2 is not indicating that a monitored parameter has been sensed and the two identified waveforms of bracket B show the time based waveforms when the sensor connected to the output of the circuit in FIG. 2 is indicating that the monitored parameter has been sensed.

Figure 3:
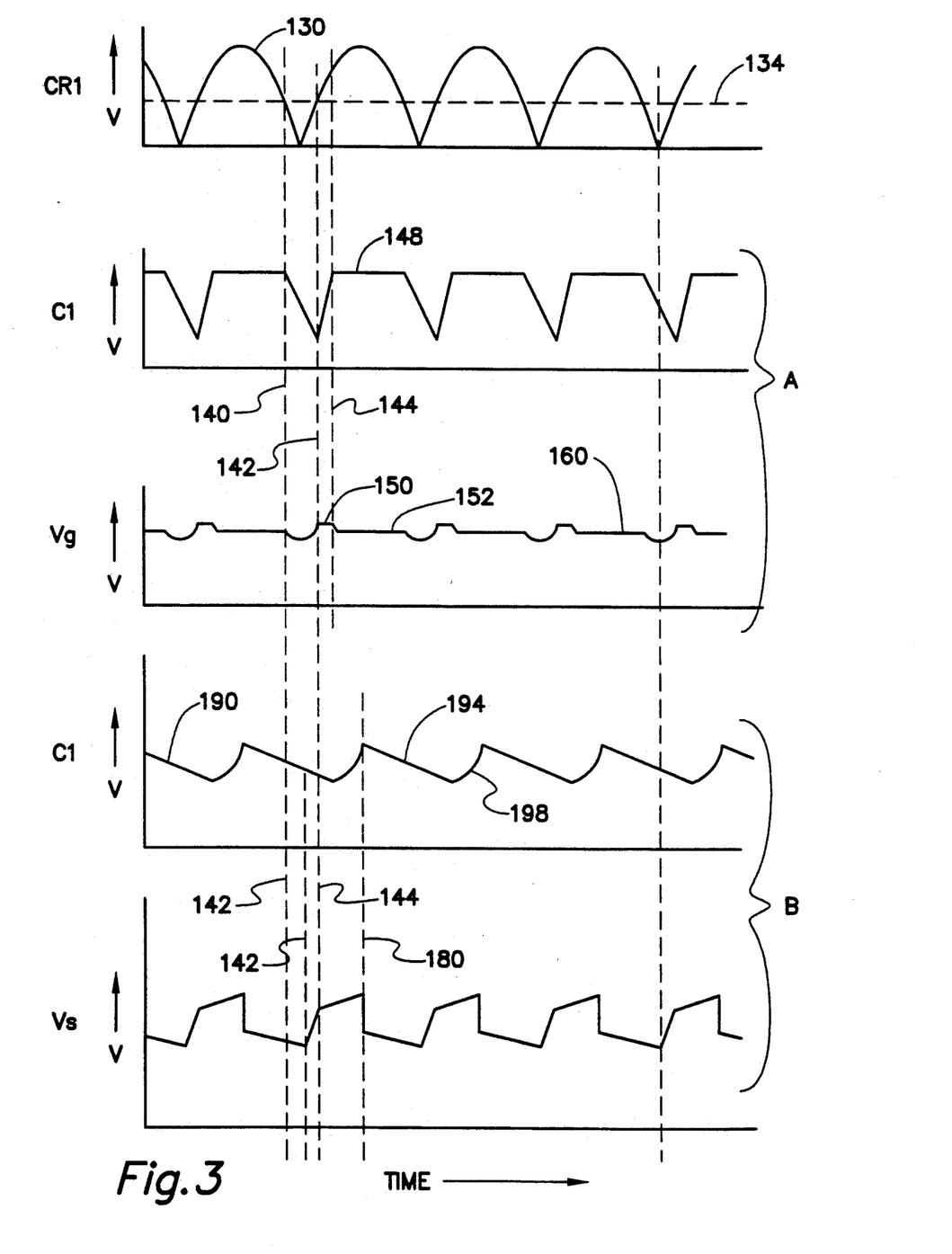
FIG. 3 shows waveforms of the voltages across a bulk capacitor and a MOSFET in association with the rectified voltage input provided to the circuit of the present invention.

With reference to bracket A in FIG. 3, the downward sloping portion of the voltage across capacitor C1, between dashed lines 140 and 142, show the voltage decrease across the bulk capacitor C1 when the voltage across Zener diode VR3 is insufficient to maintain a current flowing to the sensor connected to the circuit output. During that period of time, the capacitor maintains a sufficient current for the sensor to continue operating even though the voltage potential across circuit points P1 and P2 is insufficient to power the sensor. After the voltage output from the rectifier C1 decreases to zero and begins to increase toward the magnitude represented by dashed line 134, the capacitor C1 charges as indicated by its rising voltage between dashed line 142 and dashed line 144. This rise continues until the voltage across capacitor C1 exceeds the break over voltage of the voltage monitor 90 provided by Zener diode VR2. That voltage magnitude is shown by the value of the horizontal portion of the capacitor waveform represented by line 148.

With continued reference to bracket A of FIG. 3, the voltage $V_g$ at the gate 64 of MOSFET Q1 is shown. Between dashed lines 142 and 144, the current limiting function of the current monitor 70, in association with transistor Q2, maintains a constant current limiting voltage which is identified by reference numeral 150. When the voltage monitor 90 controls the operation of MOSFET Q1, the voltage at the gate 64 is represented by line 152. This occurs when the voltage across capacitor C1 rises to a level sufficient to cause Zener diode VR2 to break over and provide a base current for transistor Q2. The portion of curve 160 between dashed lines 140 and 142 is a function of the leakage current from capacitor C1 through resistor R2 to ground and the leakage current through Zener diode VR2.

Figure 4:
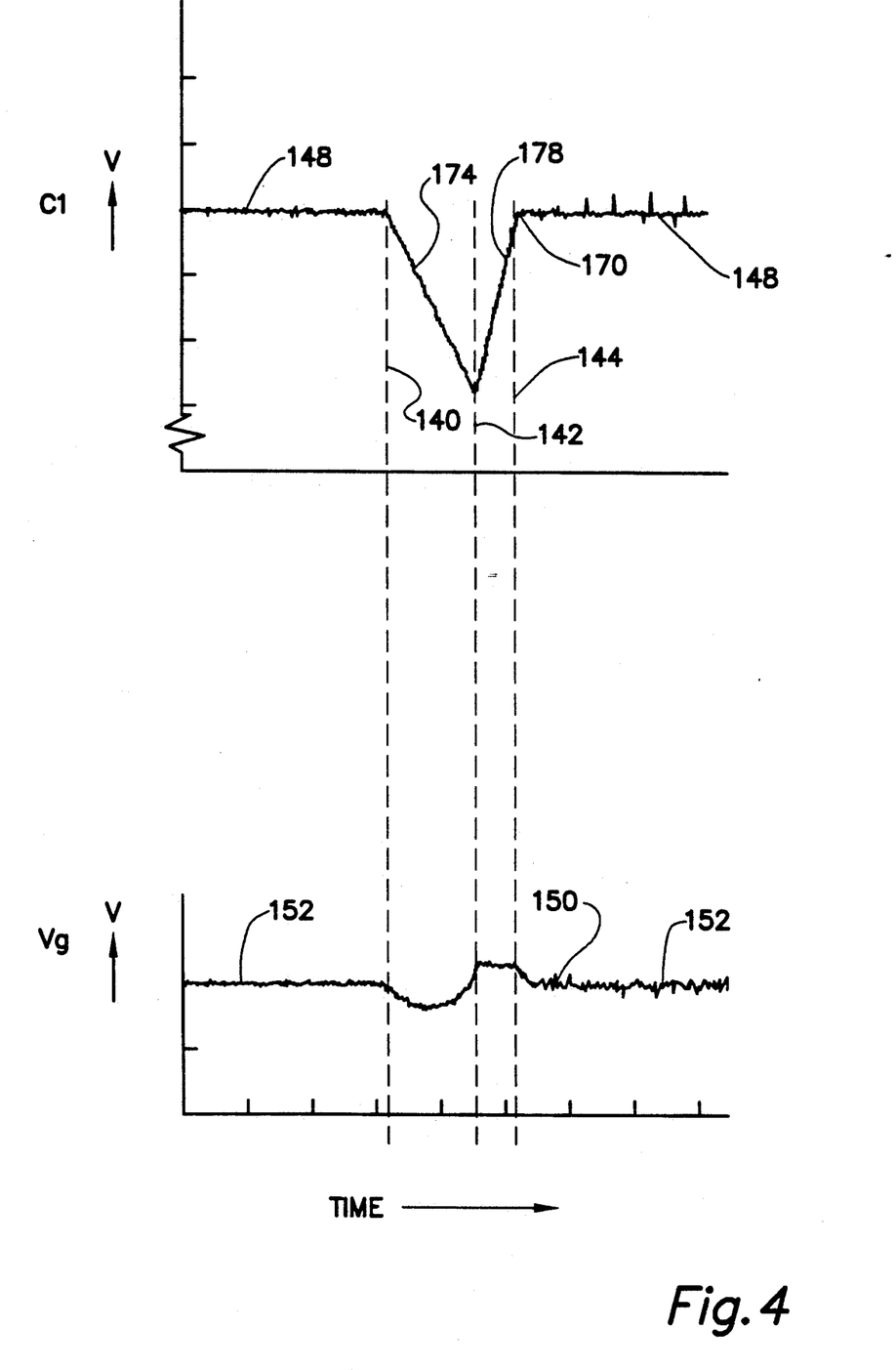
FIG. 4 shows an enlarged representation of the capacitor voltage and MOSFET gate voltage shown in FIG. 3.

The two waveforms identified by bracket A in FIG. 3 are shown in expanded detail in FIG. 4. The portion of the voltage waveform 170 that precedes dashed line 140 and follows dashed line 144 represents the voltage level of the bulk capacitor that is controlled by the break over voltage of Zener VR2 and indicates the portion of time under which the circuit in FIG. 2 is in the voltage controlled mode. The portion of the capacitor voltage waveform 1170 identified by reference numeral 174, between dashed lines 140 and 142, illustrates the decrease in voltage across the bulk capacitor C1 that occurs when current no longer flows through Zener VR3 as a result of the decrease of the rectifier CR1 output voltage below the magnitude represented by line 134 in FIG. 3. The continued decrease in voltage across capacitor C1, identified by reference numeral 174, continues between dashed lines 140 and 142 while the capacitor provides power to the sensor that is connected across circuit points P3 and P4. Then, when the magnitude of the rectifier output voltage 130 exceeds the magnitude represented by dashed line 134, which is the break over voltage of Zener VR3, the bulk capacitor C1 no longer provides current to the sensor and is able to increase its charge because of the continuing current flowing through Zener diode VR3. This voltage increase is identified by reference numeral 178 in FIG. 4 between dashed lines 142 and 144. The lower illustration in FIG. 4 shows the voltage $V_g$ at the gate 64 of MOSFET Q1 at coincident times with the upper waveform in FIG. 4. As discussed above, the portion of time when the circuit is in the voltage regulating mode because the voltage across the capacitor C1 exceeds the break over voltage of Zener VR2 is identified by reference numeral 152 and the portion of time when the current passing through resistor R5 exceeds that which is required for the current monitor 70 to cause current to flow through resistor Q2 is represented by reference numeral 150. The operation of the circuit in FIG. 2 illustrated by the time-based waveforms in FIG. 4 and bracket A of FIG. 3 show the operation of the circuit when circuit point P5 is not connected to ground by the sensor that is connected to circuit points 3, P4 and P5.

With reference to the waveforms identified by bracket B in FIG. 3, the upper waveform shows the voltage across capacitor C1 as a function of time during the period when the sensor connects circuit point P5 to ground. The portion of waveform 190 identified by reference numeral 194 represents the decrease in voltage across capacitor C1 that occurs as the charge of capacitor C1 is gradually depleted to provide operating current to the sensor. The portion of curve 190 identified by reference numeral 198 represents the portion of time when capacitor C1 is rapidly charged due to the passage of current through light emitting diode LED1 because transistor Q3 passes a current directly from the source of MOSFET Q1 to the capacitor C1 and circuit point P3. The current flowing between circuit points P1 and P3 is allowed to increase because of the absence of restriction of current flow between circuit points 40 and 42 since the status of the sensor, represented by circuit point P5 being connected to ground, indicates the desirability of passing a current through load 34 shown in FIG. 1. The point on waveform 190 when capacitor C1 begins its rapid charge occurs when MOSFET Q1 has a positive voltage across its source and drain. The voltage at the drain of the MOSFET exceeds the sum of the voltage of capacitor C1, the voltage of light emitting diode LED 1 and the voltage across the collector and emitter of transistor Q3. With reference to the lower waveform in bracket B of FIG. 3, the voltage at the source of MOSFET Q1 rises, between dashed lines 142 and 144, in accordance with the increase in voltage provided at the output from the rectifier CR1. When the voltage output from the rectifier CR1 exceeds that which is represented by dashed line 134, the voltage at the source of MOSFET Q1 rises more rapidly because of its relationship to the voltage across capacitor C1. In other words, the voltage at the source of MOSFET Q1 is equivalent to the capacitor voltage plus the voltage across light emitting diode LED1 and transistor Q3.

Figure 5:
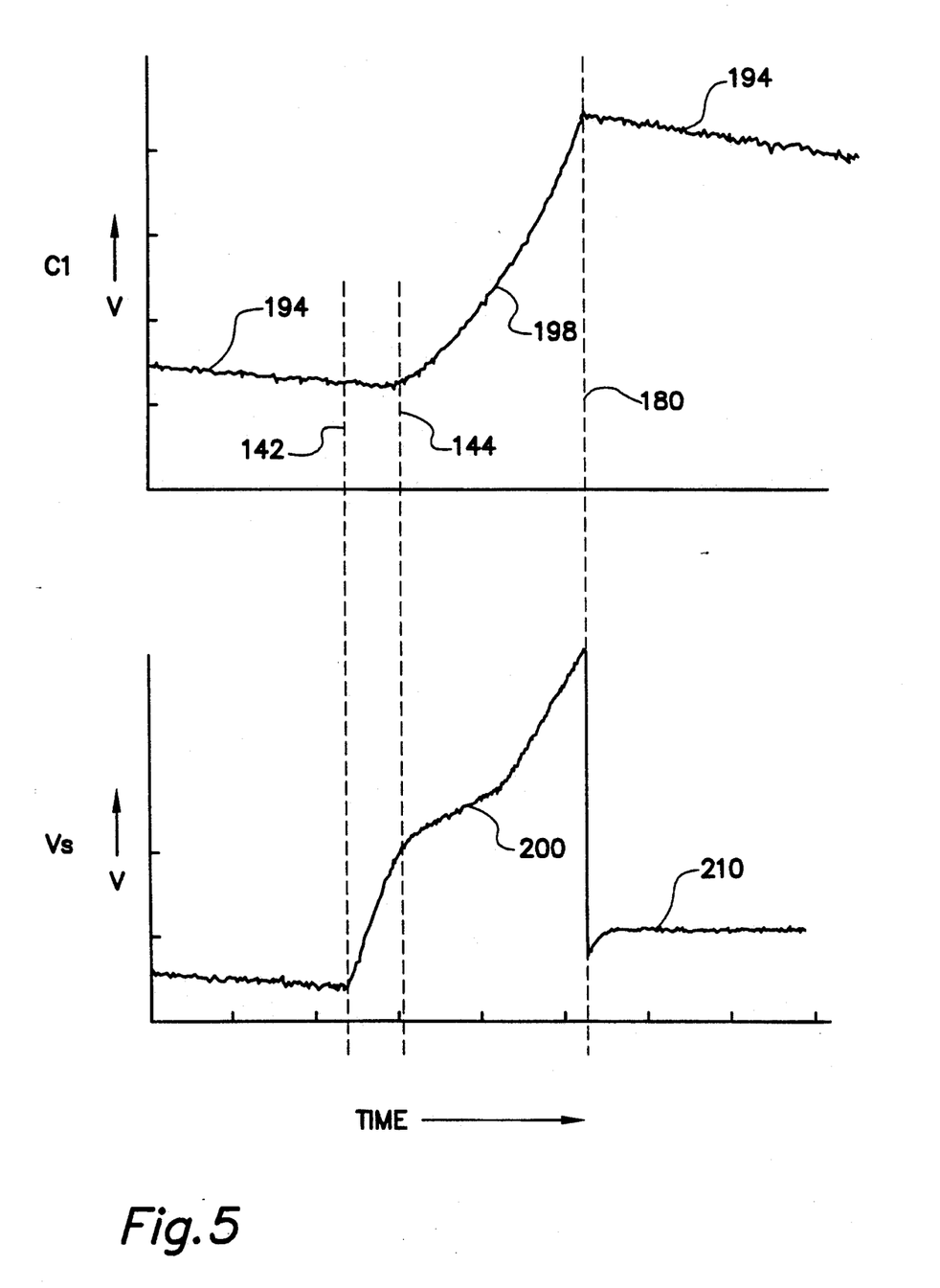
FIG. 5 shows an expanded illustration of the capacitor voltage and the source voltage of the MOSFET shown in FIG. 3.

FIG. 5 shows an enlarged view of the waveforms in bracket B of FIG. 3. The upper waveform shows the gradual decrease in voltage across capacitor C1 that is identified by reference numeral 194. This decrease occurs during the time when the charge of the capacitor is gradually depleted to provide power to the sensor when power is not available from the rectifier CR1. Reference numeral 198 in FIG. 5 shows the rapid increase in voltage across capacitor C1 as it is quickly charged by the current flowing through MOSFET Q1, transistor Q3 and light emitting diode LED 1. This rapid increase in the charge of capacitor C1 is made possible because circuit point P5 is connected to ground to provide a base current through resistor R6 for transistor Q3. With reference to the lower waveform in FIG. 5, the portion of the waveform between dashed lines 142 and 144 coincides with the increase in voltage across circuit points P1 and P2 as the rectified voltage rises from zero to the magnitude identified by dashed line 134. This rapid increase in voltage at the source of MOSFET Q1 occurs during the time when current flows through the MOSFET, but sufficient voltage is not available to break over Zener diode VR3. During the period of time between dashed lines 144 and 180, the voltage $V_g$ at the source of MOSFET Q1 rises according to the relationship identified by reference numeral 200 as described above. The magnitude of voltage $V_s$ is equal to the voltage across C1 plus the voltage across light emitting diode LED1 and transistor Q3. When the capacitor is discharging, as identified by reference numeral 194 in the upper illustration of FIG. 5, the voltage at the source 66 of MOSFET Q1 gradually decreases, as identified by reference numeral 210 in FIG. 5, because of its relationship to the charge across capacitor C1.

With reference to the circuit shown in FIG. 2, it can be seen that when circuit point P6 is not connected to ground Zener diode VR3 breaks over when the voltage across it exceeds approximately 3.9 volts in one exemplary embodiment of the present invention. This causes current to flow through resistor R5. As a result of the current flowing through resistor R5, transistor Q4 is turned on when the current through resistor R5 creates a voltage drop across the emitter and base of transistor Q4 of approximately 0.6 volts. Current flowing through transistor Q4 turns on transistor Q2. As a result of transistor Q2 conducting current, the voltage drop across resistor R2 is sufficient to provide the negative voltage at the gate 64 of MOSFET Q1 to moderate the current flowing through it. However, as the current through MOSFET Q1 is limited, the current flowing through resistor R5 is similarly limited and the voltage drop across the emitter and base of transistor Q4 is controlled. This regulates the current through transistor Q4 and limits the base current of transistor Q2 of its required base current. As a result of this limitation in the base current of transistor Q2 the current through, resistor R2 is regulated to control MOSFET Q1. As a result of these interactions, the circuit shown in FIG. 2 reaches an equilibrium condition and an appropriate current is maintained and regulated through MOSFET Q1 by the current monitor 70.

The equilibrium condition provides a current that charges the bulk capacitor to approximately 12.7 volts which is equivalent to the break over voltage of Zener diode VR2. Zener diode VR2 therefore maintains approximately 12.7 volts across the bulk capacitor C1. When Zener diode VR2 conducts current in response to the voltage across capacitor C1 exceeding 12.7 volts, transistor Q2 is turned on and the resulting voltage drop across resistor R2 reduces the current through MOSFET Q1 and limits it to a desired magnitude. These interactions result in a minimal amount of current flowing through circuit points P3 and P4 and maintains the voltage drop across these circuit points at 12.7 volts which is controlled by Zener diode VR2. The operation described immediately above occurs when circuit point P5 is not connected to ground.

When the sensor connected to the output of circuit 2 causes circuit point P5 to be connected to ground, transistor Q3 conducts a current through its collector and emitter. When transistor Q3 is conducting a current, it almost solely conducts all of the current flowing through MOSFET Q1. Because of the relative resistances of the components shown in FIG. 2, the current monitor 70 is bypassed and virtually no current flows through resistor R5. This occurs because no maximum load current restrictions exist when the sensor connected to the output of the circuit causes circuit point P5 to be connected to ground. The intent of this mode of operation is to permit a current to flow through the load that is connected in series with the power supply 24. This increased current flow through light emitting diode LED1 rapidly charges capacitor C1. When transistor Q3 is conducting virtually all of the current flowing through MOSFET Q1, the current is also permitted to flow to Zener diode VR1. When the voltage at the collector of transistor Q3 exceeds the break over voltage of Zener diode VR1, which is equal to the sum of the voltage across capacitor C1, the voltage across light emitting diode LED 1 and the voltage across the silicon controlled rectifier SCR1, the silicon controlled rectifier is turned on because current flowing through Zener diode VR1 provides a voltage drop across resistor R1 sufficient to cause the silicon controlled rectifier to conduct. This creates a short circuit across circuit points P1 and P2 and virtually deprives the circuit shown in FIG. 2 of power. As is known to those skilled in the art, silicon controlled rectifiers such as that identified as SCR1 in FIG. 2 characteristically turn themselves off when current ceases to flow through it. This occurs when the current through circuit points P1 and P2 eventually reaches the holding current of SCR1. It should be understood that as the voltage across circuit points P1 and P2 begins to increase from its zero magnitude the current flowing through the circuit is not throttled by the operation of current monitor 70 and the voltage across bulk capacitor C1 does not exceed 12.7 volts. Therefore, Zener diode VR2 does not break over and transistor Q2 does not have sufficient base current to cause a current to flow through resistor R2. As a result of the absence of a voltage drop across resistor R2, no negative voltage exists across the gate and source of MOSFET Q1. Therefore MOSFET Q1 conducts current. When MOSFET Q1 conducts current under these conditions, the current flows through transistor Q3, which is in a conducting mode because circuit point P5 is connected to ground, the light emitting diode LED 1 and to the bulk capacitor C1 to charge it quickly until the voltage across capacitor C1 plus the voltage across light emitting diode LED 1 exceed the break over voltage of Zener diode VR1 plus the voltage across silicon controlled rectifier SCR1. When the silicon controlled rectifier is caused to conduct, the power provided by rectifier CR1 flows directly from circuit point P1 to circuit point P2 and effectively provides a short across those points to deprive the circuit in FIG. 2 of power. When the circuit is deprived of power in this manner, the charge across bulk capacitor C1 is gradually depleted so that it can provide current to the sensor connected across the output of the circuit.

Although the present invention has been described in specific detail and has been illustrated with significant specificity, it should be understood that alternative implementations of the circuit shown in FIG. 2 are within the scope of the present invention.

The embodiments of the invention in which an exclusive property or right is claimed are defined as follows:

1. A voltage regulator, comprising:
   first and second circuit points connectable to a source of rectified AC power;
   third and fourth circuit points connectable to a device requiring DC power;
   means connected between said third and fourth circuit points for storing power;
   means for monitoring a current flow between said first and third circuit points;
   means for monitoring the voltage potential between said third and fourth circuit points;
   means for controlling said current flow between said first and second circuit points, said controlling means being responsive to said current flow monitoring means and said voltage potential monitoring means;
   means for connecting and disconnecting said first and second circuit points in shorted electrical communication with each other;
   means, responsive to a preselected signal from said device, for causing said connecting and disconnecting means to connect said first and second circuit points in shorted electrical communication with each other; and
   means, responsive to said causing means, for charging said storing means more rapidly in response to a presence in said preselected signal than in an absence of said preselected signal.

2. The regulator of claim 1, further comprising:
   means for disabling said current flow monitoring means in response to a presence of said preselected signal.

3. The regulator of claim 1, wherein:
   said storing means is a capacitor connected between said third and fourth circuit points.

4. The regulator of claim 1, wherein:
   said controlling means comprises a MOSFET having source and drain connections connected in series between said first and third circuit points.

5. The regulator of claim 4, wherein:
   said MOSFET is an n-channel depletion mode MOSFET.

6. The regulator of claim 1, wherein:
   said voltage potential monitoring means is a Zener diode.

7. The regulator of claim 1, wherein:
   said current flow monitoring means comprises a PNP transistor having its emitter and base connected in series between said first and third circuit points and in parallel with a first resistor.

8. The regulator of claim 1, wherein:
   said more rapidly charging means comprises an LED.

9. The regulator of claim 1, wherein:
   said connecting and disconnecting means is connected in electrically parallel association with said rapidly charging means.

10. The regulator of claim 1, further comprising:
    a rectifier connected between said first and second circuit points and to a source of AC power.

11. A voltage regulator, comprising:
    first and second circuit points connectable to a source of rectified AC power;
    third and fourth circuit points connectable to a sensor;
    a capacitor connected between said third and fourth circuit points;
    means for monitoring a current flow between said first and third circuit points;
    means for monitoring the voltage potential between said third and fourth circuit points;
    means for controlling said current flow between said first and second circuit points, said controlling means being responsive to said current flow monitoring means and said voltage potential monitoring means;
    means for connecting and disconnecting said first and second circuit points in shorted electrical communication with each other;
    means, responsive to a preselected signal from said sensor, for causing said connecting and disconnecting means to connect said first and second circuit points in shorted electrical communication with each other;
    means, responsive to said causing means, for charging said capacitor more rapidly in response to a presence of said preselected signal than in an absence of said preselected signal; and
    means for disabling said current monitoring means in response to receipt of said preselected signal.

12. The regulator of claim 11, wherein:
said controlling means comprises a MOSFET having a source and drain connections connected in series between said first and third circuit points.

13. The regulator of claim 12, wherein:
said MOSFET is an n-channel depletion mode MOSFET.

14. The regulator of claim 11, wherein:
said voltage monitoring means is a Zener diode.

15. The regulator of claim 11, wherein:
said current monitoring means comprises a PNP transistor having its emitter and base connected in series between said first and third circuit points and in parallel with a first resistor.

16. The regulator of claim 11, wherein:
said rapidly charging means comprises an LED and said connecting and disconnecting means is connected in electrically parallel association with said more rapidly charging means.

17. The regulator of claim 11, further comprising:
a rectifier connected between said first and second circuit points and to a source of AC power.

18. The regulator of claim 11, further comprising:
said sensor connected to said third and fourth circuit points.

19. A voltage regulator, comprising:
first and second circuit points connectable to a source of rectified AC power;
third and fourth circuit points connectable to a sensor;
a capacitor connected between said third and fourth circuit points;
means for monitoring a current flow between said first and third circuit points, said current flow monitoring means comprising a PNP transistor having its emitter and base connected in series between said first and third circuit points;
means for monitoring the voltage potential between said third and fourth circuit points, said voltage potential monitoring means comprising a Zener diode;
means for controlling said current flow between said first and second circuit points, said controlling means being responsive to said current flow monitoring means and said voltage potential monitoring means;
means for connecting and disconnecting said first and second circuit points in shorted electrical communication with each other;
means, responsive to a preselected signal from said sensor, for causing said connecting and disconnecting means to connect said first and second circuit points in shorted electrical communication with each other; and
means, responsive to said causing means, for charging said capacitor more rapidly in response to a presence in said preselected signal than in an absence of said preselected signal.

* * * * *